United States Patent [19]
Schantzen

[11] Patent Number: 5,628,387
[45] Date of Patent: May 13, 1997

[54] INFINITELY SELF-ADJUSTING MECHANICAL BRAKE

[75] Inventor: Wayne G. Schantzen, Thief River Falls, Minn.

[73] Assignee: Arctco, Inc., Thief River Falls, Minn.

[21] Appl. No.: 589,735

[22] Filed: Jan. 22, 1996

Related U.S. Application Data

[63] Continuation of Ser. No. 269,563, Jul. 1, 1994, abandoned.

[51] Int. Cl.$^6$ ............................................. F16D 55/02
[52] U.S. Cl. ............... 188/71.9; 188/2 D; 188/72.8; 188/72.9; 188/196 F; 188/196 V
[58] Field of Search ................. 188/2 D, 18 A, 188/71.8, 71.9, 72.7, 72.8, 72.9, 196 R, 196 F, 196 M, 196 D, 196 V, 258, 250 B, 250 G; 192/111 R, 111 A, 111 B

[56] References Cited

U.S. PATENT DOCUMENTS

| | | | |
|---|---|---|---|
| 3,024,873 | 3/1962 | Wilkinson | 188/72.8 |
| 3,378,109 | 4/1968 | Bauman | 188/196 F |
| 3,976,168 | 8/1976 | Yamamoto | 188/72.8 X |
| 3,993,170 | 11/1976 | Lessard | 188/72.9 X |
| 4,050,549 | 9/1977 | Hori et al. | 188/72.8 |
| 4,319,669 | 3/1982 | Watanabe | 188/72.8 |
| 4,635,761 | 1/1987 | Smith et al. | 188/2 D X |

OTHER PUBLICATIONS

Arctco "1992 Arctic Cat Snowmobile Illustrated Parts Manual Wildcat" Printed Nov. 1991 p. 6.
Arctco "1992 Arctic Cat Snowmobile Wildcat 700 Operator's Manual" Printed Aug. 1991 p. 27.

*Primary Examiner*—Lee Young

[57] ABSTRACT

An infinitely self-adjusting mechanical brake system which has a caliper housing and actuator assembly partially surrounding a brake disk for making small brake adjustments automatically. A brake disk pad adjacent to a mechanical brake is connected to a brake activator. A brake adjuster is connected to the brake activator for automatically adjusting to substantially reduce the gap between the brake disk pad and the brake disk.

6 Claims, 13 Drawing Sheets

INFINITELY SELF-ADJUSTING MECHANICAL BRAKE

CROSS REFERENCE TO RELATED APPLICATION(S)

This is a continuation of application Ser. No. 08/269,563 filed on Jul. 1, 1994, now abandoned.

BACKGROUND

The present invention relates to a brake system which is capable of self-adjustment during vehicle operation.

Vehicles employ a number of brake systems including mechanical and hydraulic brakes. For example, some currently available snowmobiles contain hydraulic brakes and other models use mechanical brakes. Some snowmobile manufacturers recommend that a snowmobile brake system including the brake lever, brake lever travel, wear indicator or jam nut clearance, cable, caliper, spring and disk be checked daily for wear or damage, smooth operation, and proper adjustment.

To better understand what is involved in adjusting a mechanical brake system today, take a brief look at the mechanical brake system used today such as a Nipon GT brake system. A GT brake system has a housing bracket for securing a caliper assembly, a pair of spacers, and a mounting bracket. The caliper assembly includes a caliper and brake pad on one side of a disk brake. A caliper half assembly pad spring and a brake pad are on the other side of the disk brake. Attached to the caliper half assembly is a spring, cotter pin, clevis and clevis pin.

Two specific examples of snowmobile brake system service items which should be checked frequently and serviced as required are the brake pad wear check and the brake lever travel check. Brake pad wear is monitored by checking the gap maintained between the wear indicator and the lock nut mounted on the brake adjusting bolt. Extending in sequence outwardly from the caliper half assembly in the direction opposite of the disk brake is the brake arm with the one end fixed to the clevis and the other end integrally connected to a thread which screws into the caliper half assembly. Adjacent to the brake arm is a locking tab which has one tab bent over the brake arm. Next to the jam nut is a gap which is limited on the right side of the gap by a wear indicator collar. An adjusting bolt extends through the wear indicator lock nut, locking tab, brake actuator arm and beyond the brake actuator thread within the caliper half assembly. Take note of the gap between the lock nut and the wear indicator. When the brake pads are new, the gap normally will be slight. Later, after significant vehicle and brake use, the gap increases and the wear indicator will bottom out against the lock nut when the nut is tightened. When the wear indicator bottoms out, it indicates that the brake pads are worn and must be replaced. Inspecting the gap size is also important when adjusting the brake lever travel.

To check brake lever travel, first open the hood. Rotate the brake disk by hand while at the same time applying the brake lever. Continue until the brake is locked. When the brake is locked, measure the distance between the handle bar brake lever and the lever stop located next to the steering handles on the snowmobile. The distance should be a predetermined amount. If the distance measurement is incorrect, then the brake lever travel must be adjusted. Specifically, if the handle bar brake lever to the lever stop distance is less than predetermined distance, then adjust the brake lever travel by prying the lock washer tab away from the adjusting bolt lock nut. Loosen the lock nut then turn the adjusting bolt counter-clockwise to loosen until the brake lever travel is correct. Alternatively, if brake lever travel exceeds a predetermined distance, then adjust the brake lever travel by prying the locked washer tab away from the adjusting bolt lock nut. Loosen the lock nut. Then turn the adjusting bolt clockwise to tighten until the brake lever travel is correct. Once the brake lever travel is correct, tighten the lock nut against the brake actuator arm and bend the lock washer tab over the lock nut to lock it. If the wear indicator bottoms out against the lock nut when performing this procedure, the brake pads are worn and require replacement. Check the brake before starting the engine. If the brake does not lock when the brake lever is compressed, do not start the engine until the brake is repaired or adjusted properly. Finally, close and secure the hood.

Snowmobile users who are unsure about the preceding procedure for brake alignment or who find brake alignment difficult are recommended to refer their brake alignment to their snowmobile dealer or qualified snowmobile mechanic. Other concerns involved with improper adjustment of mechanical brakes in vehicles can be found in cars, trucks, all-terrain vehicles. For the foregoing reasons, there is a need for a mechanical brake system that is self-adjusting and that can be adjusted to within a small tolerance as needed.

Accordingly, it is the object of the present invention to provide an infinitely self-adjusting mechanical brake system that improves upon or overcomes the disadvantages of the currently used systems.

SUMMARY

The present invention provides an apparatus and method for infinitely and automatically adjusting a mechanical brake system which overcomes the problems and satisfies the needs previously considered. It is an advantage of this invention to provide an apparatus and method for automatically adjusting a mechanical brake system to maintain the desired braking action between the brake pad and the brake disk quickly, easily and while on the go.

It is a feature of this invention to provide an apparatus and a method for adjusting a mechanical brake system while in motion comprising: a brake disk; a brake pad adjacent to a portion of the brake disk; a brake pad piston adjacent to the brake pad; a brake actuator adjacent to the brake pad piston for initiating and regulating the amount of braking by the mechanical brake system; and a brake adjuster rotatably connected to the brake actuator for infinitely and automatically adjusting the relationship between the brake actuator and the brake pad piston so as to maintain the desired braking action between the brake pad and the brake disk even as the brake pad wears away during use.

Other objects and advantages of the present invention will be apparent and understood from the following detailed description when taken in conjunction with the accompanying drawings.

BRIEF DESCRIPTION OF THE DRAWINGS

An infinitely self-adjusting mechanical brake system constructed as a preferred embodiment in accordance with this invention is described herein below with reference to the accompanying drawings, wherein.

DETAILED DESCRIPTION OF THE INVENTION

To assist with proper orientation when viewing the drawings, "front" as used in this detailed description and the brief description of the drawings, refers to the front of the vehicle. The front side of any component is the end closest to the front of the vehicle. The "left side" and "right side" of a part refers to the position of the part as viewed by a rider sitting in the vehicle and facing forward.

Figure 1:
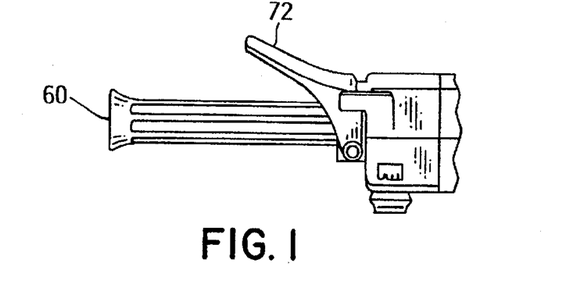
FIG. 1 is a side elevational view of the left steering handle and brake lever.

Referring now to the drawings, wherein like reference numerals designate like or corresponding parts throughout the several views, FIG. 1 illustrates a left steering handle 60 and a brake lever 72 as a part of the preferred embodiment within a snowmobile having a forwardly mounted engine which is not shown. Major snowmobile components include a traction unit, a seat area, a chassis, steering arrangement, a pair of skis, and a brake system. Three integral parts of a mechanical brake system on a snowmobile are the brake lever 72, the brake caliper and brake disk 92. On a snowmobile a common location for the brake lever 72 is on the left steering handle 60. A common location for a snowmobile brake caliper and brake disk is in the front engine compartment of the snowmobile. The brake lever 72 communicates with the brake caliper via a brake cable.

BRAKE CALIPER ASSEMBLY

Figure 2:
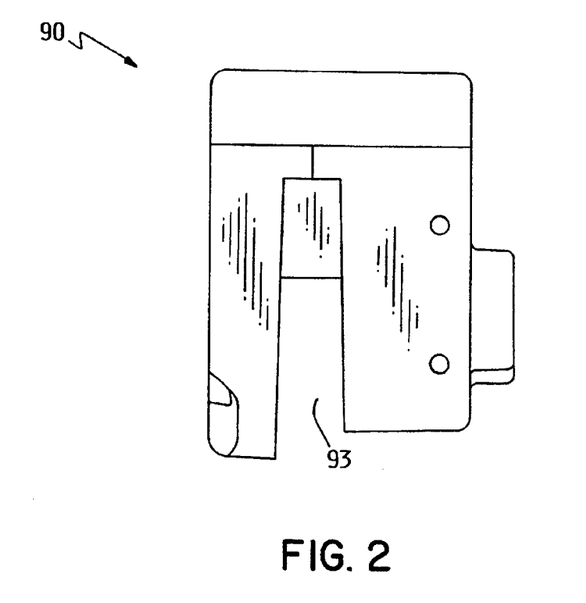
FIG. 2 is a front side perspective view of a caliper housing.
Figure 3:
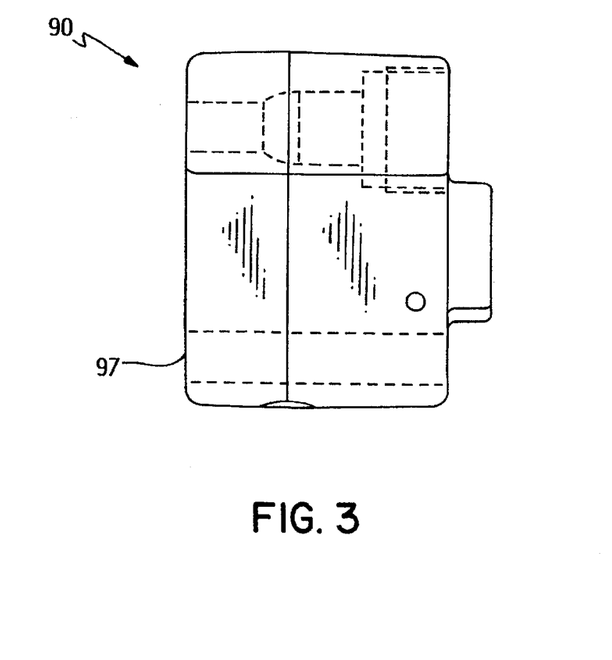
FIG. 3 is a top plan view of a caliper housing.

FIGS. 2 through 6 illustrate the caliper housing 90 of the brake caliper assembly. FIG. 2 shows a front side perspective view of the caliper housing 90. A brake disk 92 partially extends into a brake disk slot 93 of the caliper housing 90.

Figure 4:
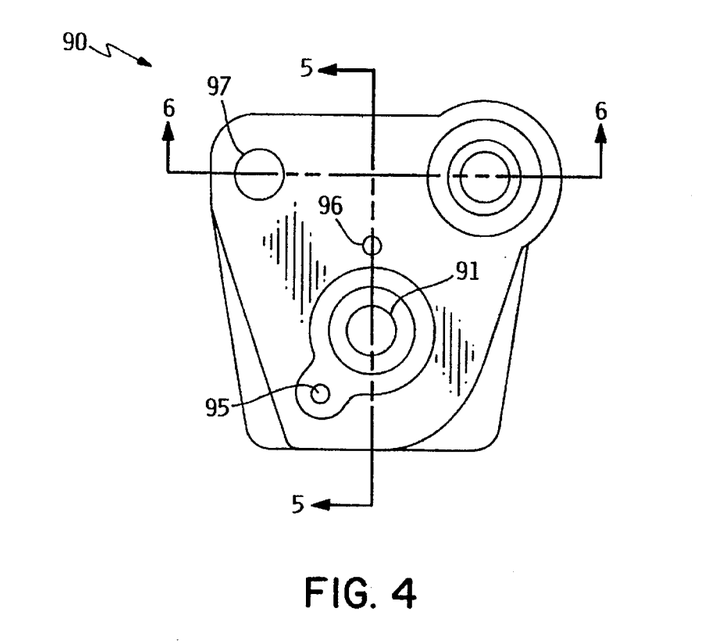
FIG. 4 is a left side elevational view of a caliper housing.
Figure 5:
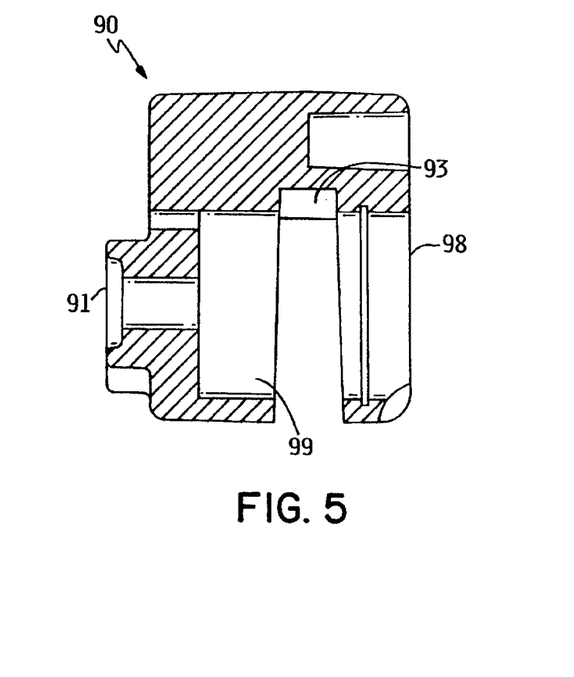
FIG. 5 shows a section of the caliper housing taken on the line 5—5 of FIG. 4 looking in the direction of the arrows.
Figure 6:
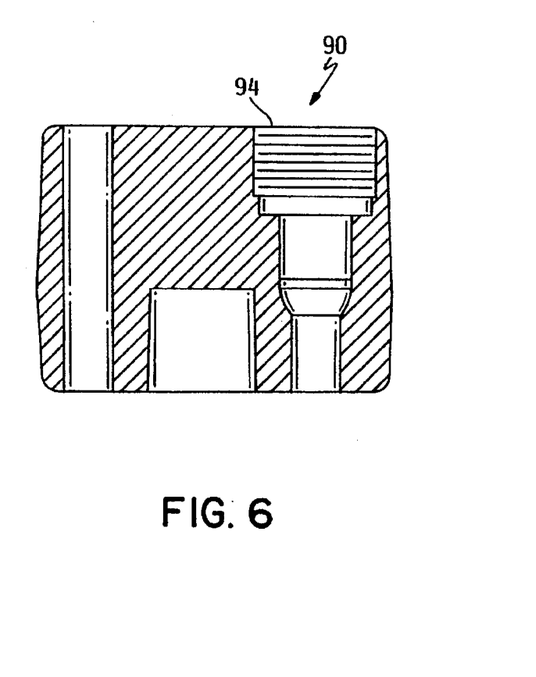
FIG. 6 shows a section of the caliper housing taken on the line 6—6 of FIG. 4 looking in the direction of the arrows.

FIG. 4 is a left side elevational view of the caliper housing 90 which contains numerous apertures. An actuator thread aperture 91 is threaded to accept an actuator housing thread 146. The cap screw aperture 95 is threaded for receipt of the cap screw thread 178. The spring pin aperture 96 is smooth and unthreaded, for accommodating the spring pin 100. The spring pin 100 resembles a hollow tube with a small portion of the metal tube cut away throughout the length of the tube.

Figure 12:
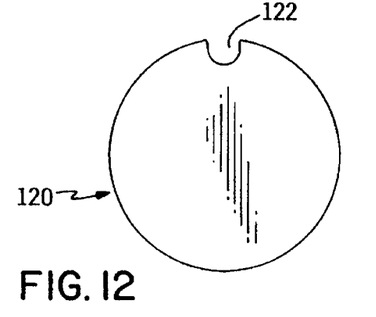
FIG. 12 is a side elevational view of the stationary brake pad.
Figure 13:
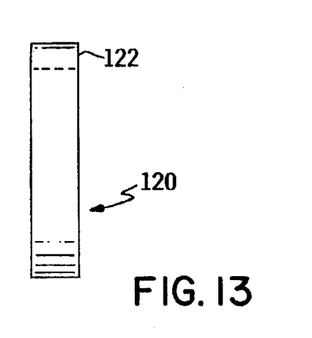
FIG. 13 is a front side elevational view of the stationary brake pad.
Figure 14:
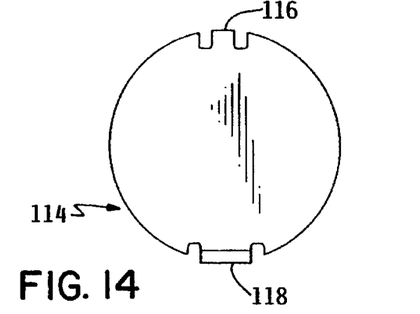
FIG. 14 is a right side elevational view of a stationary pad backing plate.
Figure 15:
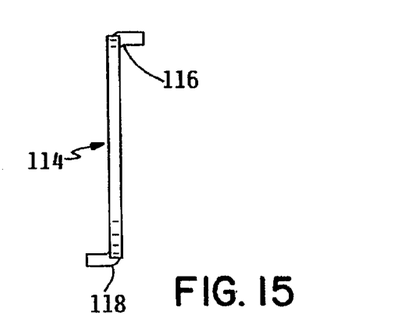
FIG. 15 is a front elevational view of the stationary pad backing plate.

Inside the caliper housing 90 are the following parts listed in sequence from the right side to the left side. See FIGS. 41 through 45. A snap ring 101 is held in place by a snap ring groove 102 cut out of the caliper housing 90 within the stationary pad chamber 98 located to the right of the brake disk slot 93. To the left of the snap ring is a stationary pad backing plate 114. The backing plate 114 retains the stationary brake pad 120. See FIGS. 12 through 15. FIGS. 14 and 15 show the backing plate top bracket 116 which faces toward the brake disk slot 93 and inserts into the stationary brake pad notch 122 as shown in FIGS. 12 and 13. Also shown in FIG. 14 is the backing plate bottom bracket 118 which bends toward the right side of the caliper housing 90 and inserts into a snap ring notch 103 formed by the ends of the snap ring 101. The stationary brake pad 120 shown in FIGS. 12 and 13 abuts the right side of the brake disk 92.

Figure 10:
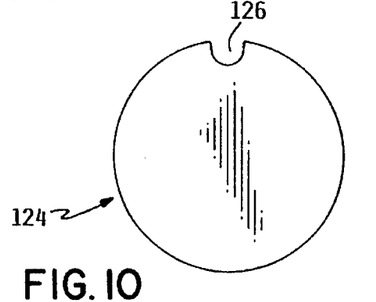
FIG. 10 is a side elevational view of a movable brake pad.
Figure 11:
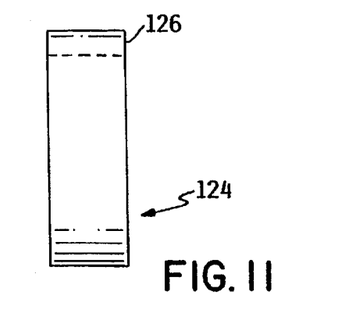
FIG. 11 is a front side elevational view of a movable brake pad.

To the left side of the brake disk 92 is a movable brake pad 124 in the movable pad chamber 99. FIGS. 10 and 11 show a side and front elevational view of the movable brake pad 124 and movable pad notch 126. Note that the movable brake pad 124 has a similar diameter but a greater thickness than the stationary brake pad 120.

Figure 7:
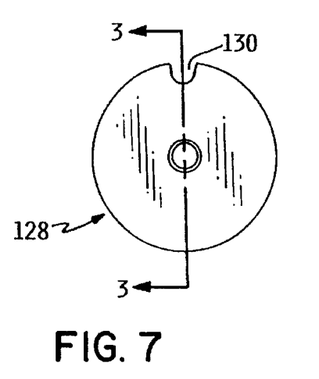
FIG. 7 shows a side elevational view of a brake pad piston.
Figure 8:
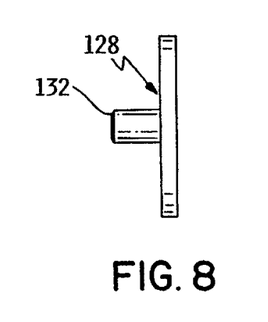
FIG. 8 shows a side elevational view of a brake pad piston rotated 90 degrees from its position in FIG. 7.
Figure 9:
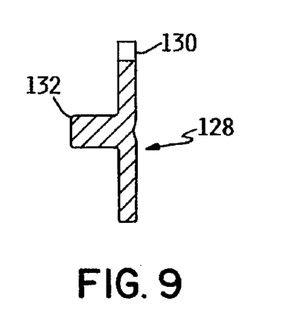
FIG. 9 shows a section of the brake pad piston taken on the line 3—3 of FIG. 7 looking in the direction of the arrows.
Figure 17:
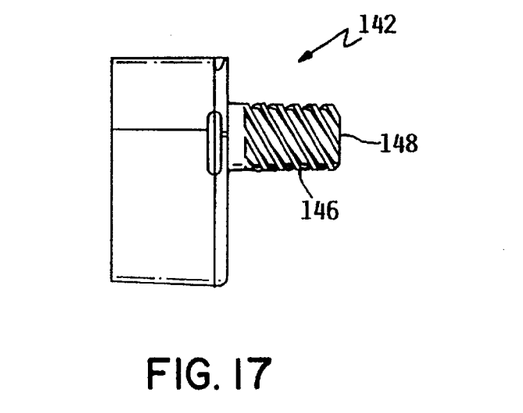
FIG. 17 shows an elevational view of the actuator housing rotated 90 degrees above the vertical access from the position as shown in FIG. 16.
Figure 18:
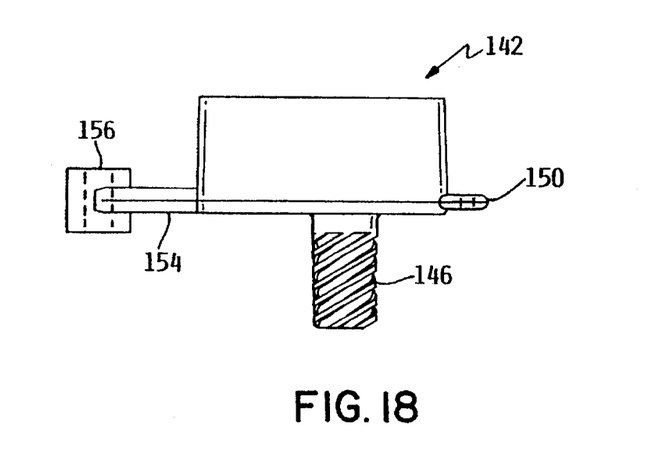
FIG. 18 shows a top plan view of the actuator housing.

FIGS. 7, 8 and 9 show a brake pad piston 128 located to the left of the movable brake pad 124. The brake pad piston neck 132 projects within an actuator housing thread aperture 148 as shown in FIG. 17. The spring pin 100 begins at the outside of the brake caliper housing 90, passes through the spring pin aperture 96, extends through the brake pad piston notch 130 and then finally through the movable brake pad notch 126 and to the left side of the brake disk slot 93. The spring pin 100 prevents rotation of the movable brake pad 124.

FIGS. 41 through 45 show the assembled brake caliper assembly.

ACTUATOR ASSEMBLY

The actuator assembly is rotatably connected to the caliper housing 90 at the actuator thread aperture 91. Major parts of the actuator assembly include an actuator housing 142, an adjusting screw 160, a torsion spring 161, a brake idler gear 180, an idler gear stop 188, and an actuator cover 200. FIGS. 41 through 45 show the assembled actuator assembly.

Figure 16:
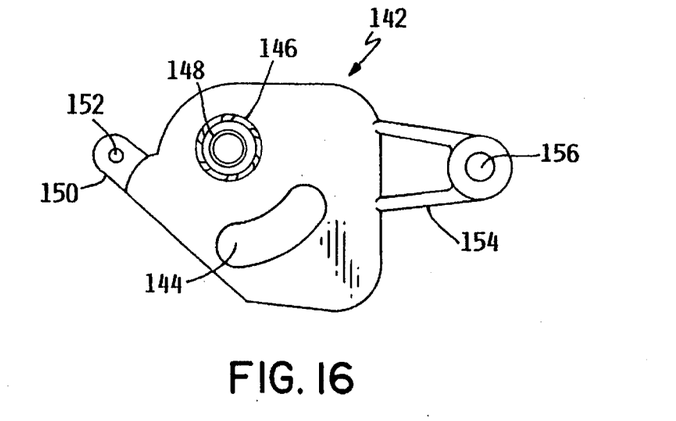
FIG. 16 shows a right side elevational view of an actuator housing of a preferred embodiment.

FIGS. 16 through 22 illustrate the actuator housing 142. Inside the actuator housing 142 is an integrally connected gear stop frame 145. A capscrew pivot slot 144 is cut through the right side of the actuator housing 142. Extending outwardly from the right side of the actuator housing 142 is an actuator housing thread 146. The actuator housing thread 146 screws into the actuator thread aperture 91 within the brake caliper housing 90. An actuator housing thread aperture 148 is hollowed out from the tube formed by the actuator housing thread 146. As shown in FIG. 16 the actuator housing 142 has an actuator return spring bracket 150 containing an actuator return spring aperture 152.

On the opposite side of the actuator housing 142 shown in FIG. 16 is the integrally connected actuator arm 154 containing an actuator arm eyelet 156. The brake cable is connected to the actuator arm eyelet 156 to communicate with the brake lever 72. One end of a return spring 151 is connected to the actuator return spring aperture 152. The other end of the return spring 151 is connected to a brake cable mounting bracket.

Figure 19:
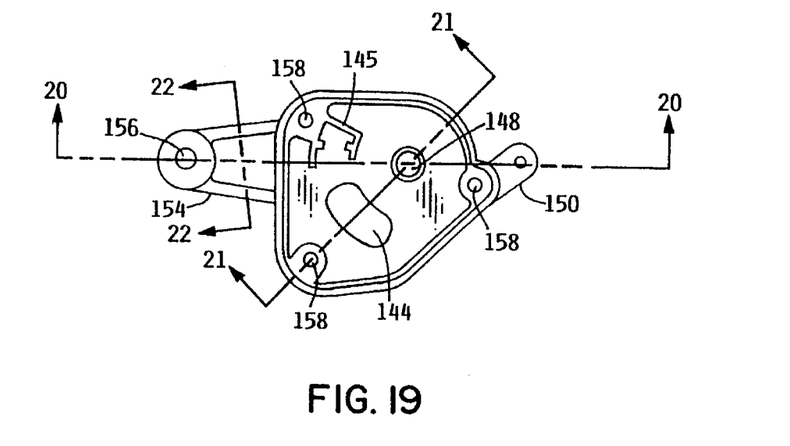
FIG. 19 is a left side elevational view of the actuator housing.
Figure 20:
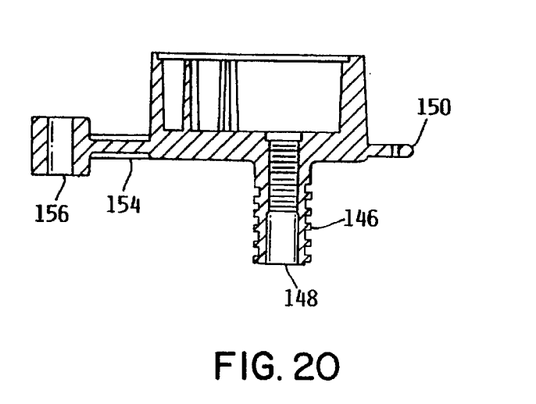
FIG. 20 shows a section of the actuator housing taken on the line 20—20 of FIG. 19 looking in the direction of the arrows.
Figure 21:
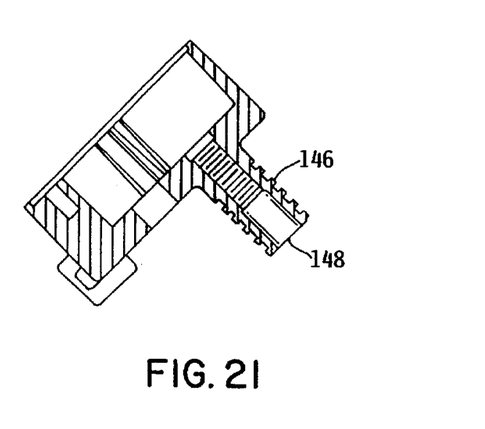
FIG. 21 shows a section of the actuator housing taken on the line 21—21 of FIG. 19 looking in the direction of the arrows.
Figure 22:
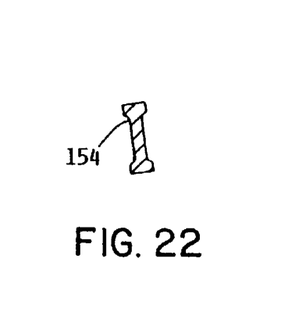
FIG. 22 shows a section of the actuator housing taken on the line 22—22 of FIG. 19 looking in the direction of the arrows.
Figure 29:
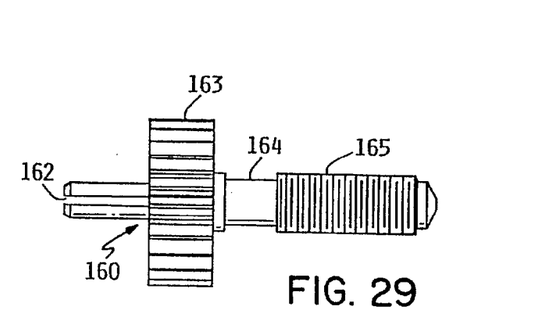
FIG. 29 is a rear side elevational view of an adjusting screw.
Figure 30:
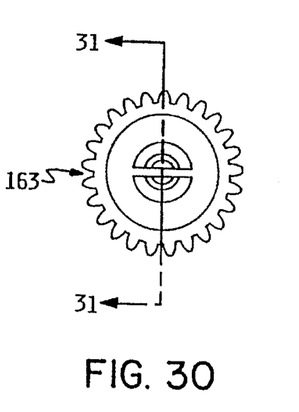
FIG. 30 shows a side elevational view of an adjusting screw gear as shown in FIG. 29.

FIG. 19 is a left side elevational view of the actuator housing 142. Three cover mounting holes 158 are located around the perimeter of the actuator housing 142. In FIG. 20, the interior of the actuator housing thread 146, the actuator housing thread aperture 148, serves dual purposes and is structured accordingly. The portion of the actuator housing thread aperture 148 closest to the inside of the actuator housing 142 is threaded for receipt of the adjusting screw thread 165 as shown in FIGS. 29 and 30. The distal end of the actuator housing thread aperture 148 is smooth. The brake pad piston neck 132 fits freely inside the distal end of the actuator housing thread aperture 148.

Figure 23:
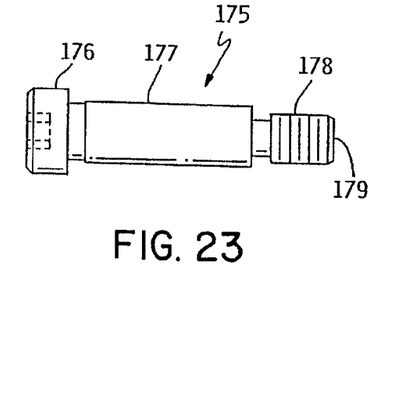
FIG. 23 shows an elevational view of a capscrew.
Figure 24:
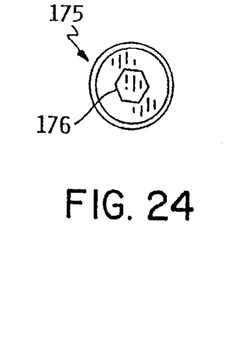
FIG. 24 shows an elevational view of a capscrew head as shown in FIG. 23.
Figure 25:
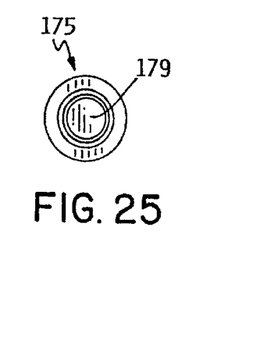
FIG. 25 is a side elevational view of the capscrew tip as shown also in FIG. 23.

Inside the actuator housing 142 is a capscrew 175. The capscrew 175 extends through the brake idler gear 180, then through the capscrew pivot slot 144 on the actuator housing 142. Finally, the capscrew thread 178 screws into the capscrew aperture 95 of the caliper housing 90. FIG. 23 shows the capscrew head 176, capscrew body 177, and capscrew thread 178. FIG. 24 shows the capscrew head 176 with a hex slot. The capscrew head 176 also has fine grooves around the perimeter of the head. Adjacent to the capscrew thread 178 is a capscrew tip 179 as shown in FIG. 25 with a flat terminal end.

Figure 34:
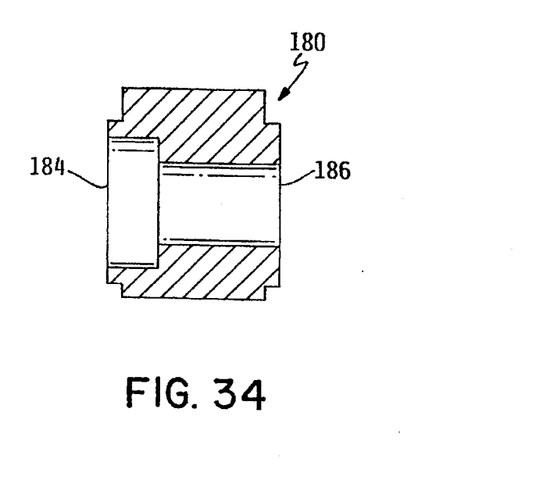
FIG. 34 shows a section of the brake idler gear taken on the line 34—34 of FIG. 33 looking in the direction of the arrows.
Figure 35:
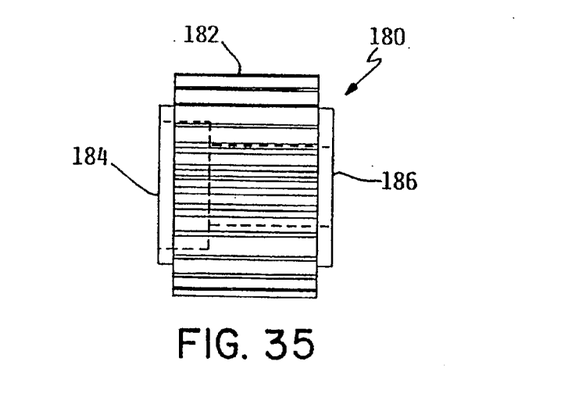
FIG. 35 shows back side elevational view of the brake idler gear.
Figure 36:
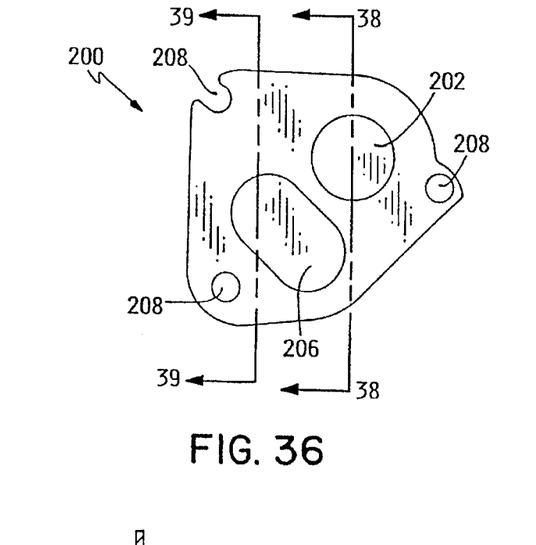
FIG. 36 shows a left side elevational view of an actuator cover.
Figure 37:
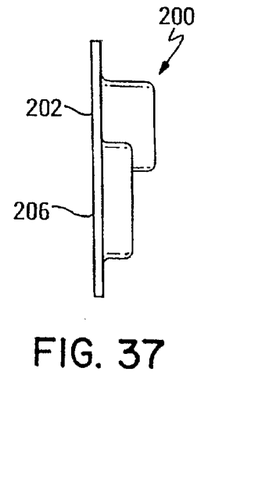
FIG. 37 is a front side elevational view of the actuator cover.
Figure 38:
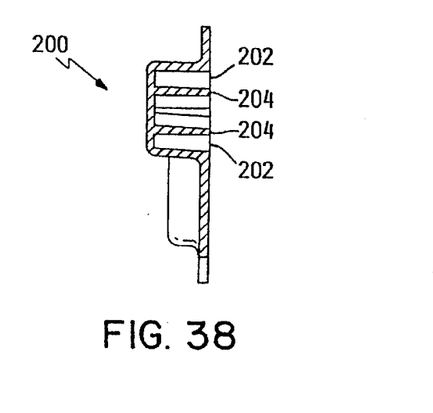
FIG. 38 shows a section of the actuator cover taken on the line 38—38 of FIG. 36 looking in the direction of the arrows.
Figure 39:
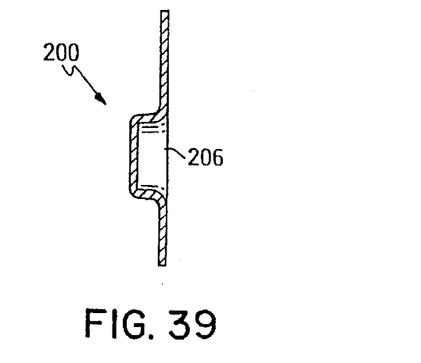
FIG. 39 shows a section of the actuator cover taken on the line 39—39 of FIG. 36 looking in the direction of the arrows.
Figure 40:
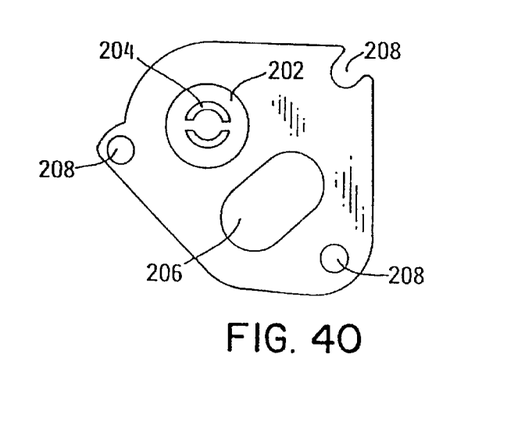
FIG. 40 shows a right side elevational view of the actuator cover.
Figure 41:
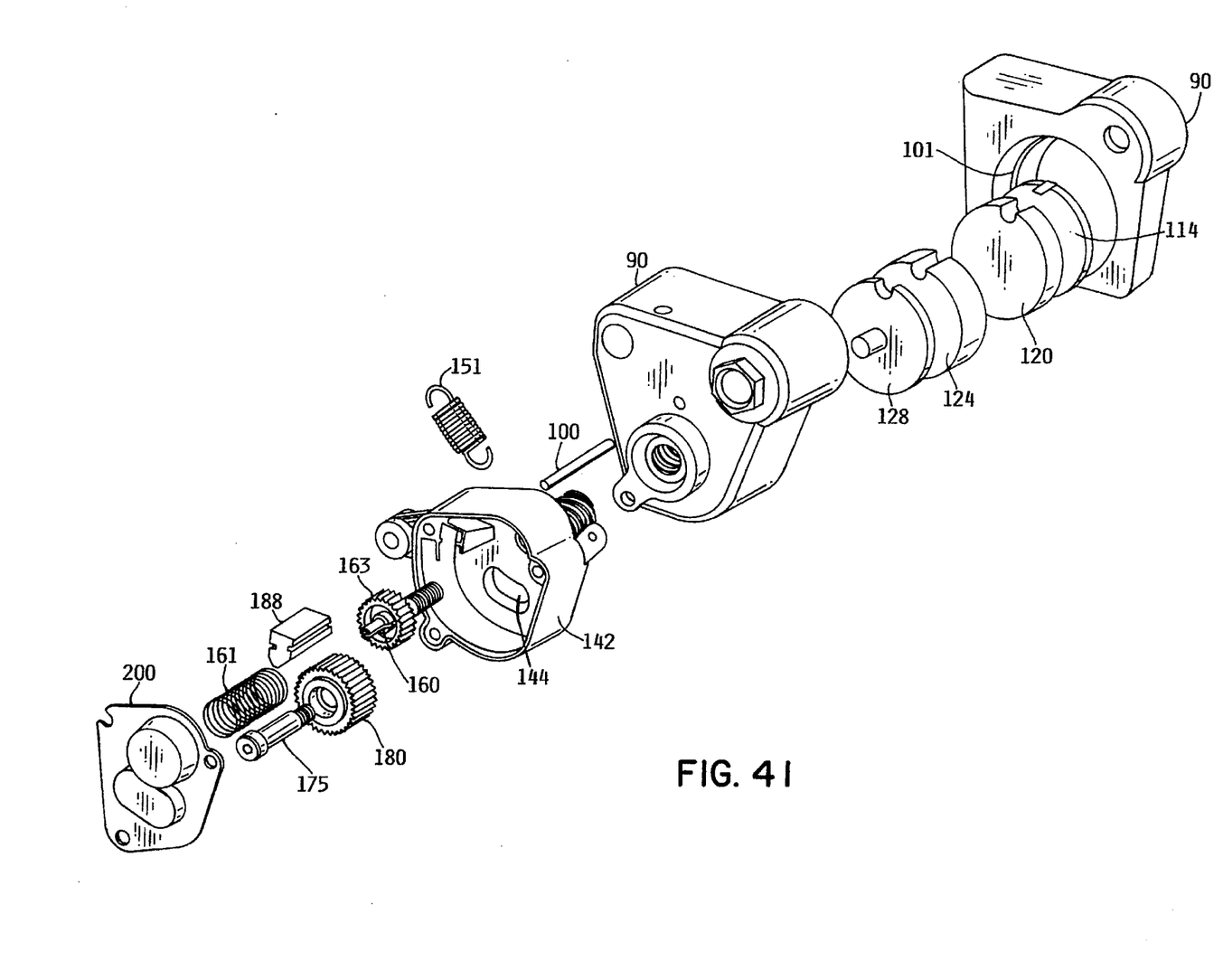
FIG. 41 is an exploded perspective view of the mechanical brake system incorporating the brake adjuster.

The capscrew 175 supports the brake idler gear 180 within the actuator housing 142. FIGS. 32 through 35 show the brake idler gear 180. Idler gear teeth 182 surrounding the perimeter of the brake idler gear 180 engage the adjacent teeth of the adjusting screw gear 163 shown in FIG. 30. FIG. 34 shows an idler gear head aperture 184 which is large enough to sufficiently accommodate the entire capscrew head 176. The capscrew body 177 fits smoothly and rotatably through the idler gear body aperture 186. FIG. 35 shows another back side elevational view of the brake idler gear 180 in addition to FIG. 34.

Figures 26, 27:
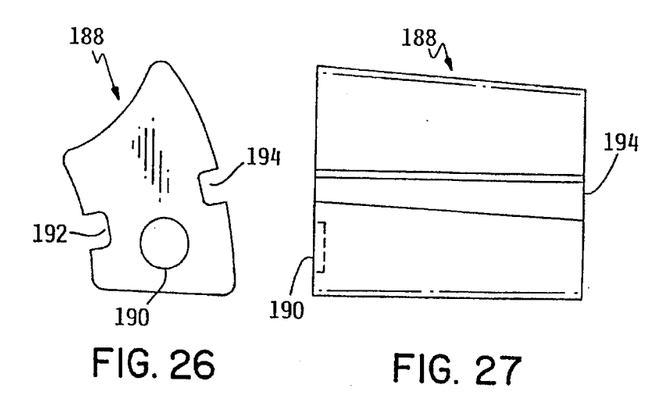
FIG. 26 shows a left side elevational view of a idler gear stop.
FIG. 27 shows a front side elevational view of the idler gear stop with a front notch running horizontally across the figure in a view of the hidden crater in the lower left-hand corner in FIG. 27.
Figure 28:
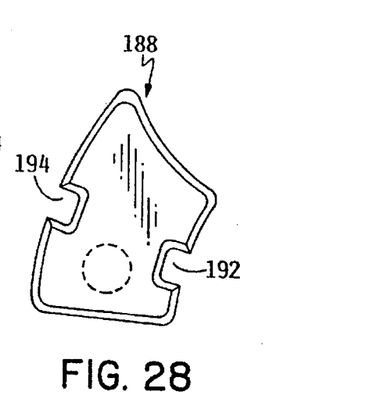
FIG. 28 is a right side elevational view of the idler gear stop.
Figure 42:
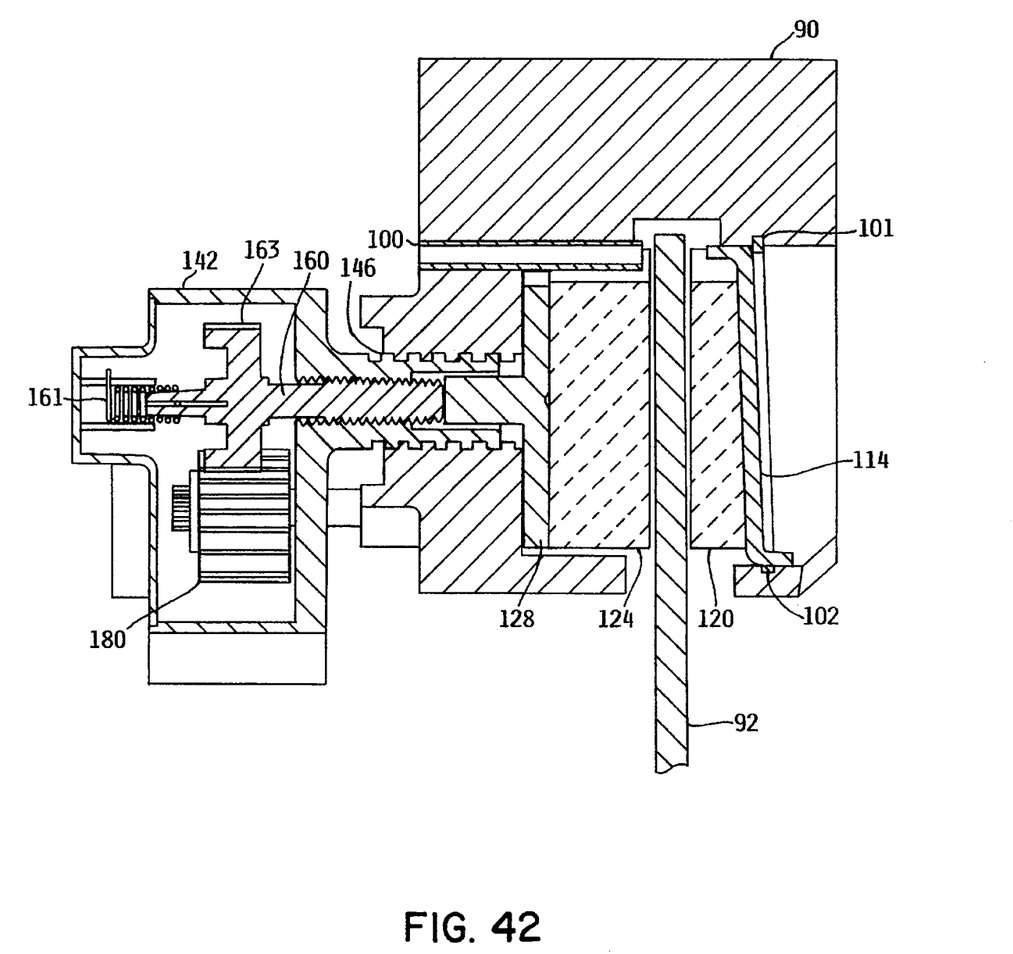
FIG. 42 is a cross-sectional view of the assembled mechanical brake system taken on a vertical plane through the adjusting screw and showing the configuration with new brake pads and the actuator and brake disengaged.
Figure 44:
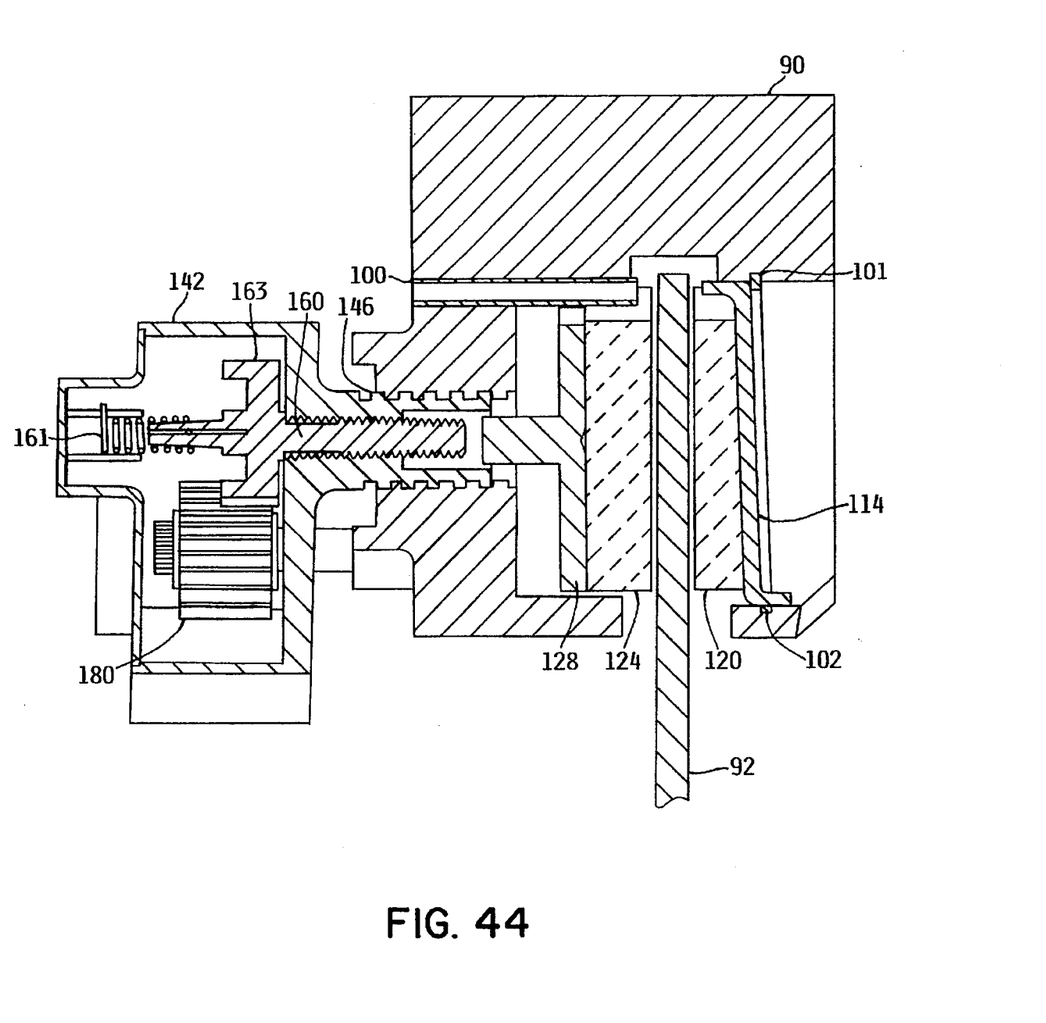
FIG. 44 is a cross-sectional view of the assembled mechanical brake system taken on a vertical plane through the adjusting screw and showing the configuration with worn brake pads and the actuator and brake disengaged.

An idler gear stop 188, pressed against the idler gear teeth 182, prevents the movement of the normally rotatable brake idler gear 180 when the brake lever 72 is released. FIGS. 26 through 28 illustrate the idler gear stop 188. FIG. 26 is a left side elevational view of the idler gear stop 188 showing a stop back notch 192, stop front notch 194 and a stop crater 190. The idler gear stop 188 is held securely within the actuator housing 142 by means of the metal idler gear stop frame 145. A stop back notch 192 and stop front notch 194 of the idler gear stop 188 fit tightly within the idler gear stop frame 145. FIG. 27 shows a front side elevational view of the idler gear stop 188. In the middle of FIG. 27 is the stop front notch 194. The stop crater is shown by hidden lines in the lower left-hand corner of FIG. 27. FIGS. 42 and 44 illustrate the configuration of the actuator assembly when the brake lever 72 is released.

Figure 31:
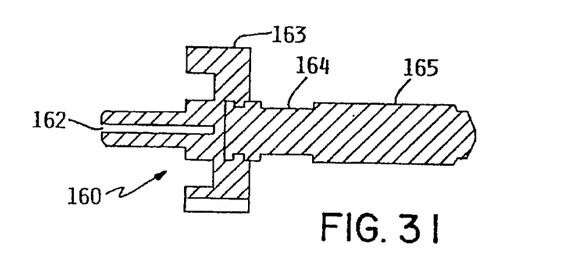
FIG. 31 shows a section of the adjusting screw taken on the line 31—31 of FIG. 30 looking in the direction of the arrows.
Figure 32:
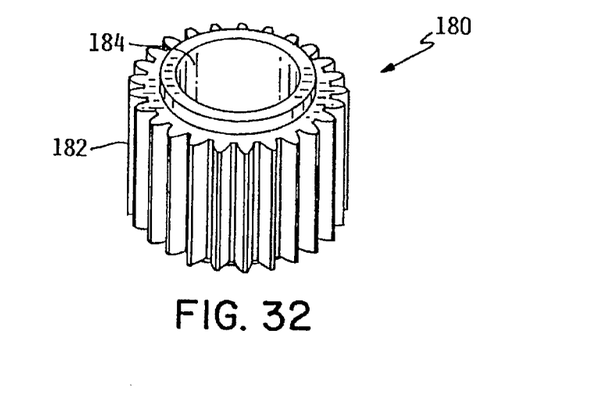
FIG. 32 is a perspective view of a brake idler gear.
Figure 33:
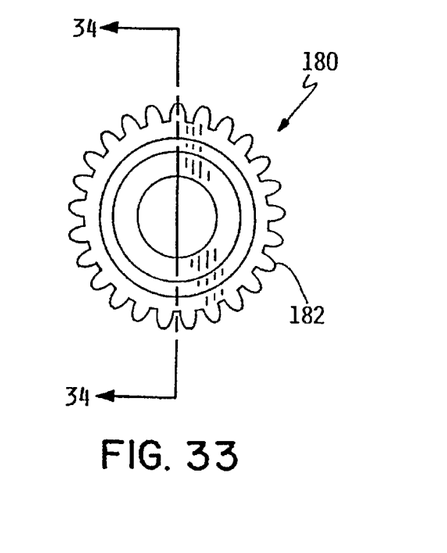
FIG. 33 shows a left side elevational view of the brake idler gear.

The brake idler gear teeth 182 engage the adjusting screw gear 163 of the adjusting screw 160. FIGS. 29 through 31 illustrate the adjusting screw 160. FIG. 29 shows a rear side elevational view of the adjusting screw 160 which includes an adjusting screw notch 162, an adjusting screw shaft 164, an adjusting screw thread 165, and an adjusting screw gear 163. The adjusting screw gear 163 is integral with the adjusting screw shaft 164. The adjusting screw thread 165 rotatably screws through the actuator housing thread aperture 148. Inserted within the adjusting screw notch 162 is a terminal of the torsion spring 161.

Figure 43:
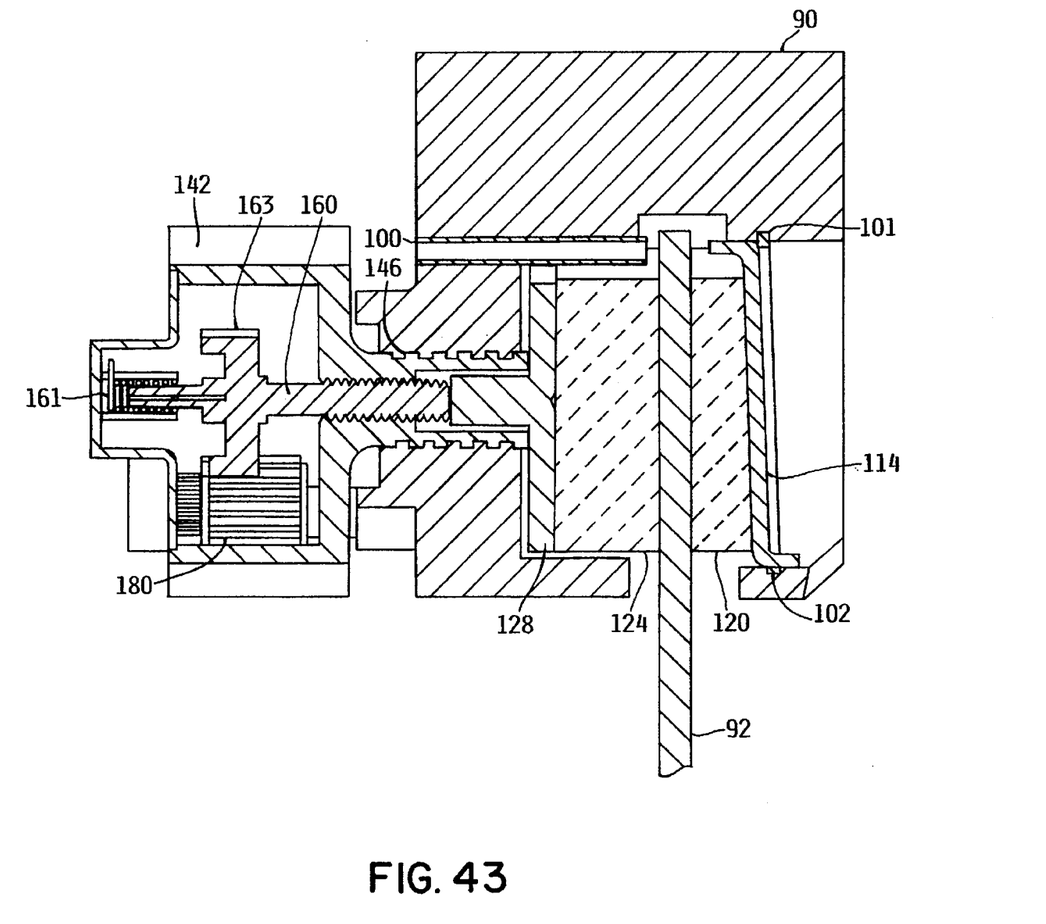
FIG. 43 is a cross-sectional view of the assembled mechanical brake system taken on a vertical plane through the adjusting screw and showing the configuration with new brake pads and the actuator and brake engaged.
Figure 45:
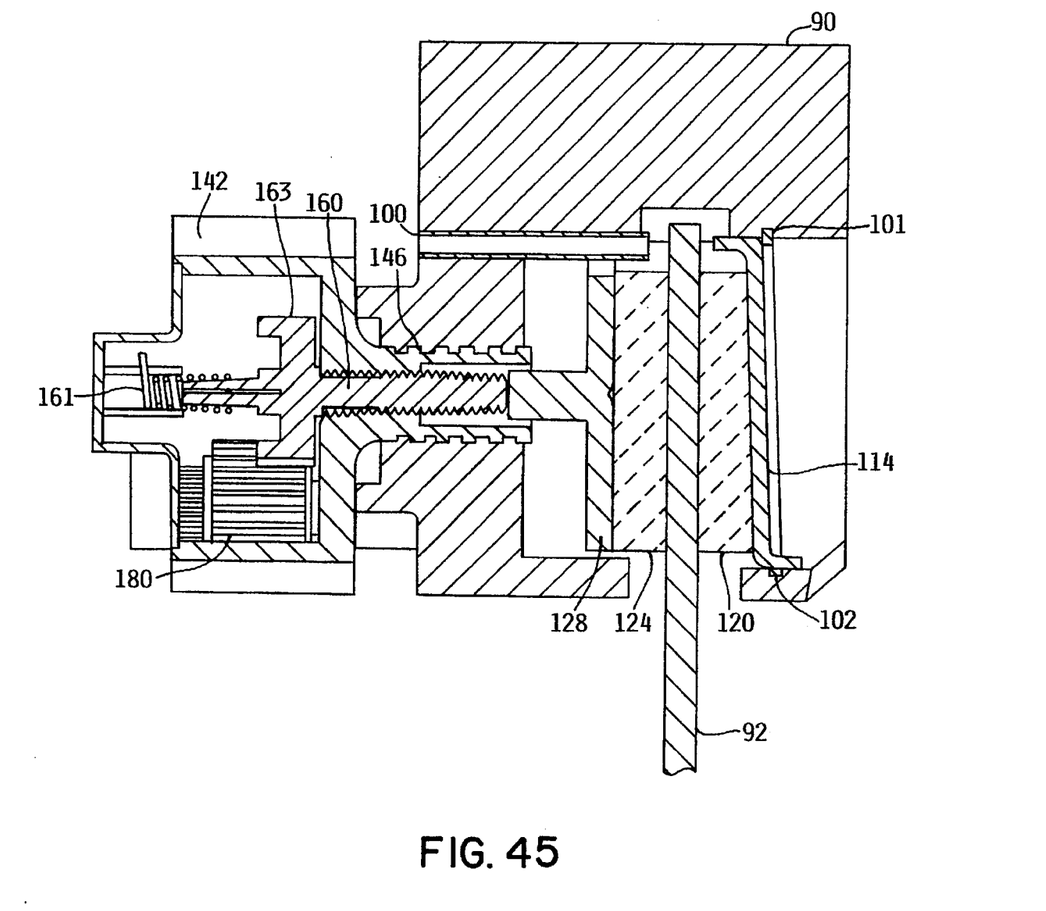
FIG. 45 is a cross-sectional view of the assembled mechanical brake system taken on a vertical plane through the adjusting screw and showing the configuration with worn brake pads and the actuator and brake engaged.
Figure 46:
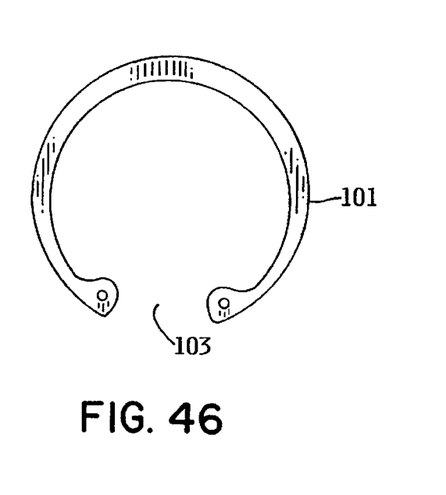
FIG. 46 is a side elevational view of the snap ring.
Figure 47:
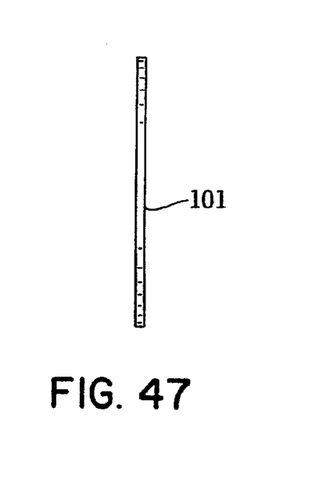
FIG. 47 is a side elevational view of the snap ring rotated 90 degrees from its position in FIG. 46.

The left side of the actuator housing 142 is completed with an actuator cover 200. The actuator cover 200 has a cover spring cavity 202, a cover capscrew cavity 206 and three cover mounting screw holes 208. FIGS. 36 through 40 show the actuator cover 200. A purpose for the cover spring cavity 202 is to provide room for a cover spring bracket 204 which retains a second terminal of the torsion spring 161. The torsion spring 161 is wound sufficiently tight to turn the adjusting screw 160 and the brake idler gear 180 when engagement of the brake lever 72 rotates the actuator housing 142 and releases the brake idler gear 180 from the idler gear stop 188. The adjusting screw 160 then rotates until it is stopped by its contact with the neck 132 of the brake pad piston 128 as the brake pad piston pushes the brake pad 124 against the brake disk 92, as illustrated in FIGS. 43 and 45. A purpose for the cover capscrew cavity 206 is to provide room for limited movement of the actuator cover 200 over the fixed capscrew head 176 within the rotating actuator housing 142.

The operation of the infinitely self-adjusting mechanical brake is as follows. A method of adjusting a mechanical braking system comprising the steps of: providing a brake disk; providing a brake pad adjacent to a portion of the brake disk; providing a brake pad piston adjacent to the brake pad; providing a brake actuator adjacent to the brake pad piston for initiating and regulating the amount of braking by the brake pad on the brake disk; providing a brake adjuster rotatably connected to the brake actuator for automatically and infinitely adjusting the distance between the actuator and the brake pad piston so as to maintain the desired braking action even as the brake pad wears away during use; holding a brake idler gear with an idler gear stop when the brake actuator is disengaged, to prevent rotation of the adjusting screw; urging the actuator away from the brake pad piston by action of the return spring when the brake lever is released; limiting the actuator movement away from the brake pad piston; activating the brake lever so as to rotate the actuator housing and thus urge the actuator housing toward the brake pad piston while releasing the brake idler gear held by the idler gear stop. Release of the brake idler gear from the idler gear stop allows the torsion spring to rotate the adjusting screw to increase its insertion into the actuator housing thread aperture until the tip of the adjusting screw contacts the end of the brake pad piston neck as the brake pad piston pushes the brake pad against the brake disk.

In the method of operation the urging of the actuator housing away from the brake disk step comprises the step of rotating the actuator housing counter-clockwise and away from the brake pad piston; limiting the actuator housing movement step comprises the step of predetermining a maximum limit to the actuator housing rotating counter-clockwise and away from the brake disk by a capscrew pivot slot on the actuator housing; urging the actuator housing toward the brake disk step comprises the step of rotating the actuator housing clockwise and toward the brake disk; and limiting the actuator housing movement toward the brake disk step comprises the step of setting a maximum limit to the actuator housing rotating clockwise and toward the brake disk by the capscrew pivot slot on the actuator housing.

Numerous characteristics and advantages of the invention covered by this document have been set forth in the foregoing description. It will be understood that other forms of the infinitely self-adjusting mechanical brake are contemplated by the present invention and that numerous modifications may be made by those with skill in the art without departing from the spirit and scope of the invention defined by the appendant claims. For example, alternatives to the torsion spring for forcing the adjusting screw into the actuator housing include but are not limited to weights or electrically powered devices.

I claim:

1. A method of adjusting a mechanical brake system, comprising the steps of:
   a) providing a brake disk;
   b) providing a brake pad adjacent to a portion of said brake disk;
   c) providing a brake pad piston adjacent to said brake pad;
   d) providing a brake actuator adjacent to said brake pad piston for initiating and regulating the amount of braking by said brake pad on said brake disk;
   e) providing a brake adjuster rotatably connected to said brake actuator for automatically and infinitely adjusting the relationship between said brake actuator and said brake pad piston through use of a torsion spring;
   f) holding a brake idler gear with an idler gear stop when the brake actuator is not engaged;
   g) activating said brake lever so as to rotate the actuator housing;
   h) urging the actuator housing toward the brake pad piston;
   i) pushing the brake pad piston toward said brake pad and said brake pad toward said brake disk with an actuator housing thread;
   j) limiting the actuator housing movement toward the brake disk;
   k) releasing said brake idler gear held by said idler gear stop when said brake actuator is engaged;
   l) urging the actuator housing away from the brake pad piston by action of a return spring when the brake lever is disengaged; and
   m) limiting the actuator housing movement away from the brake pad piston.

2. The method of claim 1, wherein
   a) urging the actuator housing away from the brake pad piston comprises the step of rotating said actuator housing counter-clockwise and away from said brake disk;
   b) limiting the actuator housing movement comprises the step of predetermining a maximum limit to said actuator housing rotation in one direction by a capscrew pivot slot on the actuator housing;
   c) urging the actuator housing toward the brake disk comprises the step of rotating said actuator housing clockwise and toward said brake disk; and
   d) limiting the actuator housing movement toward the brake disk comprises the step of setting a maximum limit to said actuator housing rotation in another direction by the capscrew pivot slot on the actuator housing.

3. A method of adjusting a mechanical brake system, comprising the steps of:
   a) providing a brake lever and a brake disk;
   b) providing a brake pad adjacent to a portion of said brake disk;
   c) providing a brake pad piston adjacent to said brake pad;

d) providing a brake actuator including an actuator housing adjacent to said brake pad piston for initiating and regulating the amount of braking by said brake pad on said brake disk;

e) providing a brake adjuster rotatably connected to said brake actuator for automatically and infinitely adjusting the relationship between said brake actuator and said brake pad piston through use of a torsion spring;

f) holding a brake idler gear with an idler gear stop when the brake actuator is not engaged;

g) activating said brake lever so as to rotate the actuator housing;

h) urging the actuator housing toward the brake pad piston;

i) pushing the brake pad piston toward said brake pad and said brake pad toward said brake disk with an actuator housing thread;

j) limiting the actuator housing movement toward the brake disk;

k) releasing said brake idler gear held by said idler gear stop when said brake actuator is engaged;

l) urging the actuator housing away from the brake pad piston by action of a return spring when the brake lever is disengaged; and m) limiting the actuator housing movement away from the brake pad piston.

4. The method of claim 3, wherein a) urging the actuator housing away from the brake pad piston comprises the step of rotating said actuator housing, thereby moving it away from said brake disk;

b) urging the actuator housing toward the brake disk comprises the step of rotating said actuator housing, thereby moving it toward said brake disk; and c) limiting the actuator housing movement comprises the step of setting maximum limits to said actuator housing rotation by the capscrew pivot slot on the actuator housing and the idler gear stop.

5. In a vehicle having a chassis, having a brake lever, having a mechanical brake system, the mechanical brake system having a brake disk and having a caliper housing adjacent to a portion of said brake disk, having a movable brake pad within said caliper housing, said movable brake pad being adjacent to said brake disk, an apparatus interconnected between the brake lever and the movable brake pad for automatically and infinitely adjusting said mechanical brake system and creating braking action on said vehicle when the brake lever is activated, said apparatus comprising:

a) an actuator assembly comprising (1) an actuator housing threadably connected to the caliper housing, said actuator housing defining
 (a) a threaded aperture for receipt of an adjusting screw; and
 (b) a cap screw pivot slot;

(2) an actuator cover removably fastened to said actuator housing and having a cover spring bracket;

(3) an adjusting screw having an inner end and an outer end, comprising
 (a) an adjusting screw thread at the inner end, said adjusting screw thread of a size and configuration to fit within the threaded aperture of the actuator housing;
 (b) an adjusting screw notch at the outer end; and
 (c) an adjusting screw gear between the adjusting screw thread and the adjusting screw notch and of a size and configuration to fit within said actuator housing;

(4) a brake idler gear defining an aperture therethrough and being of a size and configuration to fit within said actuator housing adjacent to and alternately engaged and disengaged with the adjusting screw gear;

(5) an idler gear stop within said actuator housing;

(6) a cap screw extending through the aperture of the brake idler gear and through the cap screw pivot slot and fastened to the caliper housing;

(7) a torsion spring interconnected between the adjusting screw notch of the adjusting screw and the cover spring bracket of the actuator cover; and b) a brake pad piston between the movable brake pad and the actuator assembly;

c) a brake cable interconnected between the actuator housing and the brake lever; and d) a return spring interconnected between the actuator housing and the chassis;

wherein when said brake lever is released, said return spring rotates the actuator housing about its threaded connection to the caliper housing, moving the actuator housing away from the brake pad piston and releasing the movable brake pad from contact with the brake disk; and further when said brake lever is released, the actuator housing rotates to the limit allowed by impingement of the brake idler gear on the idler gear stop, and further rotation of either the brake idler gear or the adjusting screw gear is prevented; and wherein, when said brake lever is engaged, and when said torsion spring has been tightened by rotation of the actuator cover relative to the actuator housing prior to fastening of the actuator cover to the actuator housing, rotation of the actuator housing releases the brake idler gear from the idler gear stop and permits the torsion spring to rotate the adjusting screw, urging the adjusting screw through the threaded aperture of the actuator housing until said adjusting screw contacts the brake pad piston and urges said brake pad piston toward said brake pad and said brake pad toward said brake disk to create braking action on said vehicle, thus automatically and infinitely adjusting the mechanical brake system and providing uniform braking action for the vehicle.

6. A method of automatically and infinitely adjusting a mechanical brake system in a vehicle, said vehicle having a chassis, and said mechanical brake system having a brake disk, having a brake lever, having a brake cable connected to the brake lever, having a caliper housing adjacent to a portion of said brake disk, and having a movable brake pad within said caliper housing, said movable brake pad being adjacent to said brake disk, comprising the steps of:

a) providing an actuator thread aperture and a cap screw aperture in the caliper housing;

b) providing a brake pad piston between the movable brake pad and the actuator thread aperture of the caliper housing;

c) providing an actuator housing having a threaded aperture for receipt of an adjusting screw, and having a threaded protrusion surrounding said threaded aperture;

d) placing an idler gear stop within the actuator housing;

e) threadably connecting the threaded protrusion of said actuator housing to the actuator thread aperture of the caliper housing;

f) selecting an adjusting screw having an adjusting screw notch at one end, having an adjusting screw thread of a size compatible with the threaded aperture of the actuator housing at the opposite end, having an adjusting screw gear between said adjusting screw notch and said adjusting screw thread of a size to fit within said actuator housing, and having a length sufficient to contact the brake pad piston under all operating conditions;

g) threadably connecting said adjusting screw thread to the threaded aperture of the actuator housing;

h) selecting a brake idler gear of a size and configuration to mesh with the adjusting screw gear and to fit within said actuator housing between the adjusting screw gear and the idler gear stop and to be alternately impinging upon and released from the idler gear stop, and defining an aperture therethrough;

i) providing a cap screw pivot slot in said actuator housing, said cap screw pivot slot permitting sufficient rotation of the actuator housing in a first direction for the adjusting screw to contact the brake pad piston when the brake lever is engaged, and permitting sufficient rotation of the actuator housing in the opposite direction to create contact between the brake idler gear and the idler gear stop;

j) selecting a cap screw of a size and configuration to pass through the aperture of the brake idler gear, through said cap screw pivot slot, and fasten to said caliper housing;

k) inserting the cap screw through the brake idler gear, through the cap screw pivot slot of the actuator housing, and threadably connecting said cap screw to the cap screw aperture of the caliper housing;

l) providing a removable actuator cover for the actuator housing, said actuator cover having a cover spring bracket for a torsion spring;

m) interconnecting a torsion spring between the cover spring bracket and the adjusting screw notch, rotating the actuator cover to tighten the torsion spring, and fastening the actuator cover to the actuator housing;

n) providing and attaching a return spring so that when the brake lever is released the return spring causes the actuator housing to rotate about its threaded protrusion, moving said actuator housing away from said brake pad piston to the extent permitted by impingement of the brake idler gear upon the idler gear stop;

o) fastening the brake cable to the actuator housing so that when the brake lever is engaged the actuator housing is rotated about its threaded protrusion, moving said actuator housing toward said brake pad piston;

p) compensating for wear of the movable brake pad by automatic rotation of the adjusting screw through the threaded aperture of the actuator housing to impinge on the brake pad piston each time the brake lever is engaged, thus automatically and infinitely adjusting the mechanical brake system and providing uniform braking action for the vehicle.

\* \* \* \* \*